United States Patent

[11] 3,579,831

| [72] | Inventors | Irving J. Stevens<br>130 Margaret Blvd., Merrick, N.Y. 11566;<br>Jerry Alexander, 64 Hedgerow Lane,<br>Jericho, N.Y. 11753 |
|---|---|---|
| [21] | Appl. No. | 804,625 |
| [22] | Filed | Mar. 5, 1969 |
| [45] | Patented | May 25, 1971 |

[54] BONE IMPLANT
9 Claims, 4 Drawing Figs.

| [52] | U.S. Cl. | 32/10 |
|---|---|---|
| [51] | Int. Cl. | A61c 13/00 |
| [50] | Field of Search | 32/10 |

[56] References Cited
UNITED STATES PATENTS

| 3,474,537 | 10/1969 | Christensen | 32/10 |
|---|---|---|---|
| 2,347,567 | 4/1944 | Kresse | 32/10 |
| 2,472,103 | 6/1949 | Giesen | 32/10UX |
| 2,745,180 | 5/1956 | Kiernan, Jr. | 32/10 |
| 2,857,670 | 10/1958 | Kiernan, Jr. | 32/10 |
| 3,386,169 | 6/1968 | Scialom | 32/10 |

*Primary Examiner*—Robert Peshock
*Attorney*—Steinberg and Blake

ABSTRACT: A bone implant such as a dental implant to be received in a jaw bone. The bone implant includes a screw which has a pair of opposed end regions, one of which is threaded for the purpose of screwing into bone and the other of which is provided with a means for fastening any other desired structure to the screw. For example, in the case of a dental implant this fastening means can be used to fasten a crown to the screw. In addition to the screw the bone implant of the invention includes at least one stabilizing pin operatively connected with the screw to stabilize the latter in the bone, so that as a result of the stabilizing, the screw will be reliably retained in the bone.

PATENTED MAY 25 1971 3,579,831
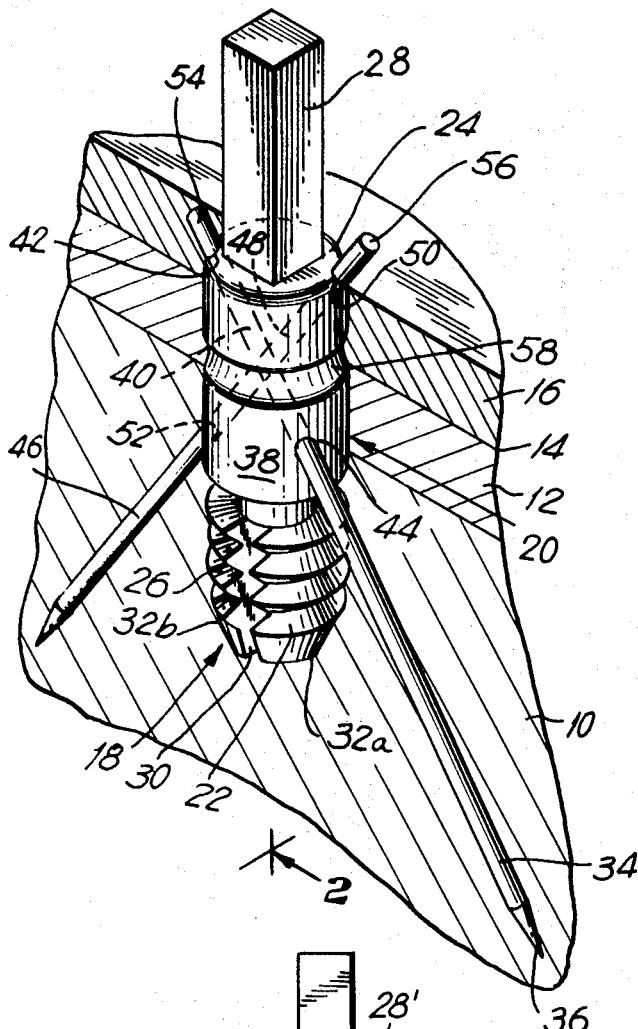
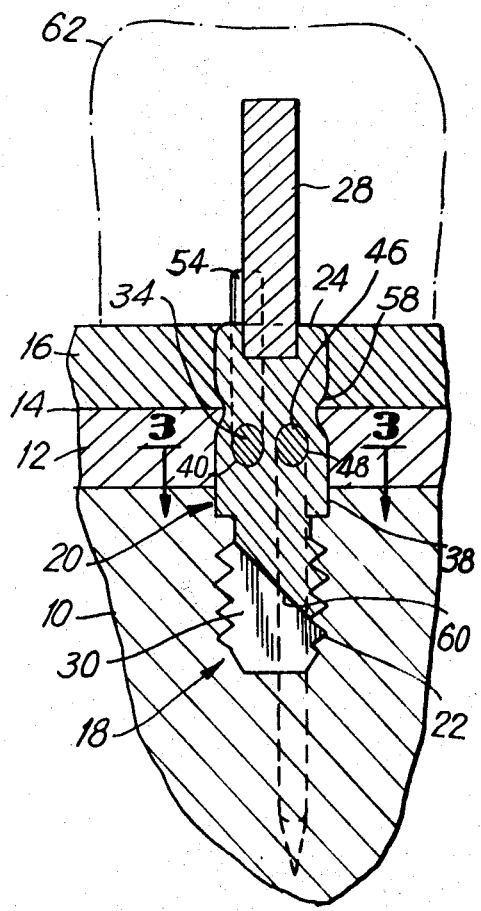
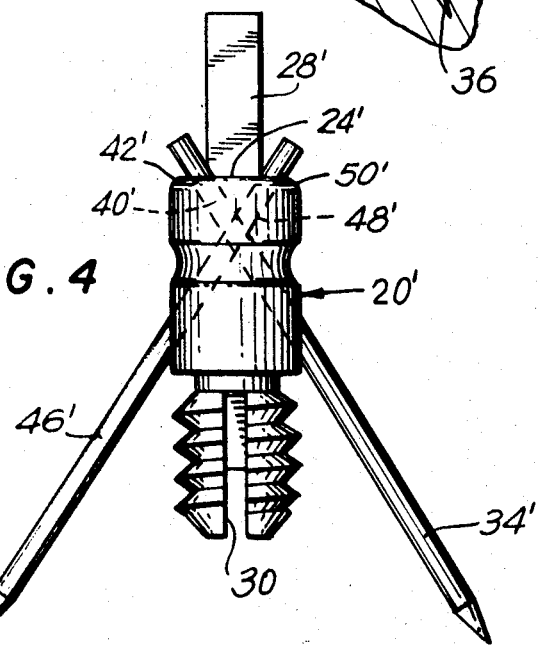
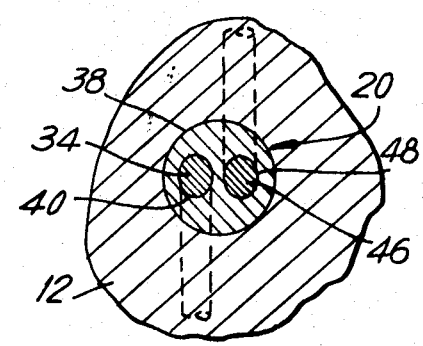
INVENTORS
IRVING J. STEVENS
JERRY ALEXANDER
BY Steinberg & Blake
ATTORNEYS

3,579,831

BONE IMPLANT

BACKGROUND OF THE INVENTION

The present invention relates to implants.

In particular, the present invention relates to bone implants adapted to be received in a bone of the human body for the purpose of anchoring any desired structure to the bone. For example, in the case of a dental implant, a crown may be fastened to the jaw bone within the mouth to serve as a tooth.

Implants of this general type are known. However, they suffer from serious drawbacks. In the first place they are comparatively primitive. In the second place many are difficult to introduce into the bony tissue. However, perhaps the most serious drawback resides in the fact that conventional implants cannot be reliably stabilized within the bone. Stresses and vibrations to which implants are subjected can result in loosening of implants so that they are not securely retained within the bone. This is due in vectorial and rotational stresses for which conventional implants have not been compensated. In the case of dental implants these disadvantages are particularly serious because of the stresses set up during chewing, biting, etc.

SUMMARY OF THE INVENTION

It is accordingly a primary objective of the present invention to provide a bone implant which will avoid the above drawbacks.

In particular, it is an object of the invention to provide a bone implant which is characterized by an exceedingly simple structure, which can be easily introduced to the desired location, and which when mounted will be very securely retained in its mounted condition even when subjected to stresses such as those encountered by a dental implant.

In particular it is an object of the present invention to provide a bone implant of the above type with a structure which will stabilize the implant when it is in the bone to such an extent that a perfectly reliable, secure mounting of the implant is assured.

Yet another object of the invention is to provide a bone implant having stabilizing pins but requiring no predrilling for the stabilizing pins. Thus, it is an object of the invention to provide such pins with a construction which will enable them to enter without difficulty into bone which may be extremely dense.

In particular, it is an object of the invention to provide an implant with guide bores for the stabilizing pins, these guide bores not only guiding the stabilizing pins but also preventing distortion or breakage thereof when they are introduced into bone.

It is in addition an object of the invention to provide a construction where that part of the implant which is received in the tissue has no sharp edges which can create any undesirable friction. Thus, it is an object of the invention to provide a construction where the implant has only smooth, rounded surfaces at the portions thereof which are received in the tissue.

Also, it is an object of the invention to provide an implant which can readily be adapted to the conditions encountered at the location where the implant is to be introduced. Thus, it is an object of the invention to provide a bone implant which can easily be adapted so as to accommodate itself even in a relatively limited space in an entirely secure manner without any possibility of interfering with body cavities and while at the same time achieving a completely reliable and secure mounting of the implant in the bone even in those situations where the curvature and thickness of the bone would ordinarily militate against a secure mounting of an implant.

According to the invention the implant includes an elongated screw means having a pair of opposed end regions one of which is threaded and the other of which carries a means for fastening to the screw means any desired structure which in the case of a dental implant may be a crown. A stabilizing means coacts with the screw means to stabilize the latter in the bone and this stabilizing means includes at least one stabilizing pin connected with the screw means and extending with the latter into the bone while preferably having a nonparallel relationship with respect to the screw means.

BRIEF DESCRIPTION OF DRAWINGS

The invention is illustrated by way of example in the accompanying drawings which form part of this application and in which:

FIG. 1 is a perspective illustration of an implant of the invention shown with a fragmentarily and schematically as well as sectionally illustrated jaw bone structure;

FIG. 2 is a traverse sectional elevation of the structure of FIG. 1 taken along line 2-2 of FIG. 1 in the direction of the arrows;

FIG. 3 is a sectional plan view of the structure of FIGS. 1 and 2 taken along line 3-3 of FIG. 2 in the direction of the arrows; and FIG. 4 is a front elevation of a structure similar to that of FIGS. 1—3 but varied so as to meet a set of conditions different from those met by the structure of FIGS. 1—3.

DESCRIPTION OF PREFERRED EMBODIMENTS

Although the bone implant of the invention can be used generally in bony tissue at any part of the body, the invention is illustrated as a dental implant situated in the jawbone. Thus, referring to FIGS. 1 and 2, the schematic illustration of the jawbone shows the alveolar bone section 10 having the outer cortical bone portion 12 which terminates at the crest 14 where the soft tissue 16 of the jawbone meets the cortical bone section 12.

The dental implant 18 illustrated in the drawings includes an elongated screw means 20 having opposed end regions 22 and 24. The end region 22 is provided with threads 26 while the opposed end region 24 fixedly carries a means 28 for fastening to the screw means 20 any desired structure which in the particular case of a dental implant will be a crown. Thus, the fastening means 28 will be received in a correspondingly shaped recess of the crown to which the fastening means 28 will be cemented, for example, by way of a thin film of cement. In the illustrated example this fastening means 28 is in the form of a noncircular bar portion projecting from the screw means 20 at its end region 24 so that this means 28 also serves the function of providing a portion of the assembly which can be received in a tool such as a wrench which may be manipulated to turn the screw means 20 into a previously drilled bore formed in the jawbone.

The threads 26 at the end region 22 are preferably of the self-tapping type, and in order to enhance the self-tapping action the screw means 20 is formed with an axially extending notch 30 so as to provide the end region 22 with a pair of springy threaded portions 32a and 32b capable of resiliently flexing toward and away from each other so as to enhance the self-threading action of the screw means 20. In addition the notch 30 forms a drainage cavity into which fluids can drain as well as a cavity into which the tissue of the bone can grow so as to provide, when the bone tissue fills the notch 30, an absolutely secure connection of the implant in the bone structure.

The elongated screw means 20 may be made of any materials suitable for implantation in the human body without corrosion or other deleterious effects. It is preferred to make the screw means 20 of titanium because this metal can be readily machined and at the same time is noncorrosive and of a very light weight. However, it is possible also to make the screw means of a metal such as stainless steel, of a metal such as Vitalium, or even of a plastic or ceramic material. The entire structure is readily and accurately machined so as to have the illustrated construction. After the hole is drilled in the bony tissue the screw means 20 is turned into position by applying a wrench to the noncircular projecting portion 28 which forms the fastening means. Once the screw means 20 is turned into its final position forming its own thread with the self-tapping threads 26 at the region 22 the wrench or other tool applied to the means 28 is removed and then this means 28 can be cut down to the length required for insertion into the recess in the crown or other implement which is to be attached to the screw means.

In accordance with a particular feature of the invention a stabilizing means is operatively connected to the screw means 20 for stabilizing the latter in the bone which in the illustrated example is a jawbone. This stabilizing means of the invention includes at least one pin 34 made of the same material as the screw means 20. The pin 34 is of a circular cross section and is provided with a bottom pointed tip 36. Although the pin 34 can, for example, extend parallel to the axis of the screw means 20 while being displaced from this axis, it is preferred to provide the stabilizing pin 34 with an orientation where it extends at an angle with respect to the axis of the screw means 20. For this purpose, according to a further feature of the invention, the shank 38 of the screw means 20 is formed with an inclined bore 40 which receives the pin 34. The shank 38 extends between the opposed end regions 22 and 24 of the screw means 20 and the bore 40 has an outer inlet end 42 for initially receiving the pointed end 36 of the pin 34, and a inner end 44 through which the pin 34 extends in the manner shown in FIG. 1. Thus, after the screw means 20 has been placed in position the bore 40 will form a convenient guide through which pin 34 can be subsequently introduced to the position shown in FIG. 1.

Although it is perfectly possible to practice the invention with only one pin 34, which in itself will serve to stabilize the screw means 20 in the bony tissue by preventing any rotary movement of the screw means 20, it is preferred to provide an even greater security in the mounting of the implant by using a pair of oppositely inclined stabilizing pins. Thus, the preferred combination of the assembly of the invention includes a second stabilizing pin 46 which may be identical with the pin 34 and which extends through an oppositely inclined bore 48 formed in the shank 38 of the screw means 20. This oppositely inclined bore 48 also has an outer inlet end 50 and a inner end 52 through which the pin 46 extends in the manner illustrated in the drawing.

The extent to which the stabilizing pins 34 and 46 project into the bony tissue is very precisely controlled, and the same is true of the location of the screw means 20, so that in accordance with the particular conditions encountered at the region where the implant is located there will be no interference with any body cavities, for example. Moreover, although in the case of a jawbone, for example, there may be regions of sharp curvature and small thickness, the pins 34 and 46 are arranged so that they will be situated approximately in planes parallel to planes tangent to the exterior surfaces of the bone structure, so that there is no possibility of the pins 34 and 46 projecting to the exterior of the bone and an extremely secure mounting is assured. Thus, before the implant is mounted the physician or dentist will know in advance exactly what conditions are to be encountered so that the size and orientation of the parts will be very closely controlled so as not to interfere in any way with the existing conditions and so as to assure a secure mounting of the implant.

Once the pins 34 and 46 have been introduced to the required depth, the outer free ends 54 and 56 thereof can be cut away so that they will not interfere with the structure which is to be attached to the implant such as a crown in the case of a dental implant. As was pointed out above, the fastening means 28 is also shortened to the required length after the screw means 20 has been located in position. While normally the ends 54 and 56 will be cut away so as to be flush with the exterior surface of the screw means 20, it is preferred to leave a very slight portion of the stabilizing pins projecting beyond the exterior surface of the screw means so that if it is ever desired to remove the implant it will be possible to engage outer ends of the stabilizing pins with pliers or the like to facilitate withdrawal of the pins after which the screw means 20 can be removed. Thus, it will be seen that with the invention the pins form a stabilizing means which is readily accessible at the outer end region of the screw means 20. As was pointed out above, the notch 30 forms not only a drainage cavity but also a space into which the bony tissue will grow in order to form an extremely secure connection for the implant.

As was pointed out above the particular details of the implant of the invention can vary so as to be adapted to the particular conditions which are to be encountered. Thus, it is possible to provide for the stabilizing pins 34 and 46 different inclinations in accordance with the conditions are encountered. Normally it will be desired to provide for the stabilizing pins as sharp an inclination as possible, which is to say an inclination where the stabilizing pins approach as much as possible an attitude where they extend perpendicularly with respect to the axis of the screw means 20 so that where the latter extends vertically it will be desired to provide for the pins 34 and 46 an inclination where they approach the horizontal as much as possible. However, with this latter type of construction the pins 34 and 46 will extend laterally to the largest extent so that even a relatively short length of the pins 34 and 46 will project to a considerable distance laterally beyond the screw means 20. Because the conditions encountered in the human body do not lend themselves at all times to such an arrangement, it will be necessary under most circumstances to provide for the pins 34 and 46 an inclination where they approach more or less an attitude midway between a position extending parallel to the axis of the screw means 20 and a position extending perpendicularly to the axis of the screw means 20. In the particular example shown in FIGS. 1—3 the pins 34 and 46 extend at an angle which is relatively sharply inclined in that these pins in the illustrated position extend to a very large degree toward a horizontal attitude. Where such an arrangement cannot be accommodated, because, for example, in the particular location of the implant the pins would extend into a sinus cavity or other body cavity, it is possible to provide for the structure of the invention an arrangement as shown in FIG. 4 which is identical with that of FIGS. 1—3 except that the bores and the stabilizing pins are not inclined to the extent shown in FIGS. 1—3 with the pins of FIG. 4 more closely approaching the axis of the screw means 20. Thus, as may be seen from FIG. 4, the elongated screw means 20' is identical with the screw means 20 except that the bores 40' and 48' make with the axis of the screw means, when projected onto the plane of FIG. 4, an angle smaller than the angle made by the bores 40 and 48. Thus, it will be noted that with the embodiment of FIG. 4 the bores 40' and 48' have their outer inlet ends 42' and 50' located closer to the fastening means 28' at the outer flat surface of the end region 24'. In contrast, with the arrangement of FIGS. 1—3 the inlet ends 42 and 50 of the bores 40 and 48 are located at the junction between the exterior side surface of the shank 38 and the flat outer end surface at the end region 24.

Thus, the structure of the invention will be provided in different forms as indicated by the difference between FIGS. 1 and 4 so that the physician or dentist will have available different arrangements one of which will be the most suitable for the particular conditions which are encountered.

The shank 38 is formed between the ends of the bores 40 and 48 with an annular groove 58. The location of this groove 58 is such that when the screw means 20 is in its final position the junction 14 between the soft tissue 16 and the crest of the cortical bone region 12 is located precisely at the groove 58. This groove will provide the implant with a contour which will minimize the stress on the crest of the cortical bone region 12.

It is also to be noted that the notch 30 is limited by an end surface 60 which is inclined in the manner shown most clearly in FIG. 2, so that as a result of this feature a substantial space is provided for drainage and growth of tissue while at the same time the rigidity of the screw means 20 is maintained to achieve a secure robust implant.

As is apparent from the above description, once a careful analysis is made of the conditions which will be encountered, the physician or dentist will choose a suitable implant of the invention and will first introduce the screw means 20 or 20'. Thereafter the oppositely inclined bores 40, 48 or 40', 48' will receive and serve to guide the stabilizing pins through the dense cortical bone region. These are precisely introduced to the required depth after which their free ends are cut off in the manner described above, and of course the means 28 or 28' will also be shortened to the required extent, as pointed out above. FIG. 2 shows in dot-dash lines a crown 62 held by the fastening means 28 in its proper position with respect to the screw means.

I claim:

1. A bone implant comprising elongated screw means to be fitted into a bone, said screw means having an elongated shank provided with a pair of opposed end regions one of which is threaded and the other of which carries a fastening means for fastening a structure to said screw means, said shank being formed between said opposed end regions with at least one elongated bore inclined to the axis of said shank and passing therethrough, and stabilizing means operatively connected with said screw means for stabilizing the latter in a bone, said stabilizing means including at least one stabilizing pin removably assembled with said screw means, extending through and beyond said bore of said shank, and having a portion accessible at said other end region of said screw means to facilitate removal of said stabilizing means and removal of said s crew means, if necessary.

2. The combination of claim 1 and wherein said pin has an outer end which is accessible at said other end region of said screw means to facilitate removal of said pin from said screw means.

3. The combination of claim 2 and wherein said screw means and stabilizing pin have a nonparallel nonperpendicular relationship with respect to each other.

4. The combination of claim 1 and wherein said threaded end region of said screw means has a self-tapping thread.

5. The combination of claim 4 and wherein said screw means is made of a springy material, terminates at said threaded end region in a tapered tip, and is formed at said threaded end region with an axially extending slot having an open end at said tip and providing said screw means with springy threaded portions which enhance the self-tapping operations.

6. The combination of claim 1 and wherein the implant is a dental implant and said screw means is adapted to extend in a jaw bone and said shank being formed between said end regions at its exterior with an annular groove to be situated at the crest of the cortical bone for minimizing stress.

7. The combination of claim 1 and wherein said shank is formed between said end regions thereof with a pair of said bores which are oppositely inclined and said stabilizing means including a pair of oppositely inclined stabilizing pins connected with said screw means for stabilizing the latter in a bone, said stabilizing pins respectively having outer ends accessible at said other end region of said screw means.

8. The combination of claim 7 and wherein the inclinations of said bores are preselected for situating said screw means and pins at regions of a bone capable of accommodating said screw means and pins.

9. The combination of claim 8 and wherein said bores respectively have outer pin-receiving ends situated at said other end region of said screw means where said fastening means is located and said bores respectively terminating in inner ends situated at an exterior side surface of said screw means between said opposed end regions thereof.